July 24, 1923.

W. R. LOVEMAN

ELECTRIC BATTERY

Original Filed Jan. 5, 1921

1,462,795

INVENTOR
William R. Loveman
BY
ATTORNEY

Patented July 24, 1923.

1,462,795

UNITED STATES PATENT OFFICE.

WILLIAM R. LOVEMAN, OF BRIDGEPORT, CONNECTICUT, ASSIGNOR TO THE BRIDGEPORT METAL GOODS MANUFACTURING COMPANY, OF BRIDGEPORT, CONNECTICUT, A CORPORATION OF CONNECTICUT.

ELECTRIC BATTERY.

Application filed January 5, 1921, Serial No. 435,185. Renewed December 6, 1922.

*To all whom it may concern:*

Be it known that I, WILLIAM R. LOVEMAN, a citizen of the United States, residing at Bridgeport, county of Fairfield, State of Connecticut, have invented an Improvement in Electric Batteries, of which the following is a specification.

This invention relates to improvements in dry cell batteries in general, and at the same time its development has been evolved more particularly in connection with those commonly known as bag type batteries.

The prime object of the invention is to produce a high grade battery at a comparatively low cost by utilizing in localized relation a relatively small amount of first grade depolarizing material, which is much more expensive than ordinary depolarizing material used in commercial batteries. In my invention I provide a battery having a zinc container, forming the negative electrode, and a bobbin of depolarizing material forming the positive electrode, in which the greater bulk of the depolarizer consists of any of the well known depolarizing materials, such as manganese dioxide moistened with an exciting fluid, and the remaining portion of the depolarizer consisting of a small amount of highly efficient, expensive, depolarizing material, the said depolarizers being of different depolarizing power.

Another object is to concentrate the depolarizer having the greatest efficiency in the vicinity of one electrode and to provide the remainder, which includes the bulk of the battery, with a common conducting material which may be practically devoid of depolarizing value, or have only a limited amount thereof but yet would occlude the exciting agents and moisture. It has been found in practice that a relatively thin layer of the depolarizer, directly adjacent the negative electrode, receives the greatest amount of action, in fact the central portion of the depolarizer has practically no function in the life of the battery, but is not salvagable due to the solidified form it assumes in the container. Consequently, I provide a battery with a thin outer layer of highly efficient depolarizer, such as artificially prepared depolarizer or depolarizer other than manganese dioxide, in concentrated form, and a relatively thick inner layer of such common depolarizer as manganese dioxide.

The above and other objects will be apparent from the following description and drawings, and will be especially pointed out in the appended claims.

Figure 1:
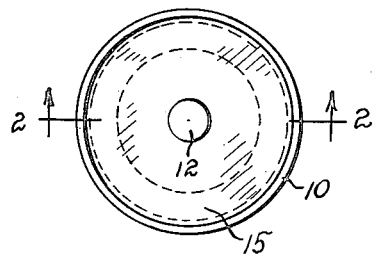
Fig. 1 is a top plan view of the battery.
Figure 2:
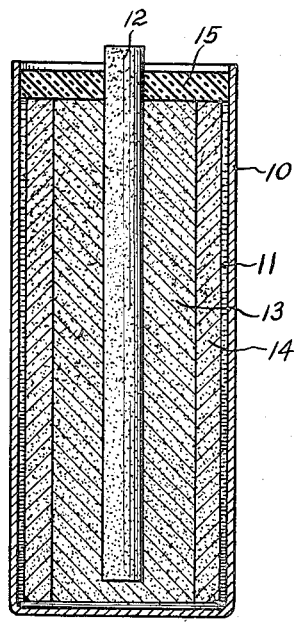
Fig. 2 is a cross sectional view on line 2—2 in Fig. 1, looking in the direction of the arrows.

In the embodiment of the invention illustrated herein 10 denotes the ordinary zinc battery shell, which may be soldered or seamless, constituting the negative electrode of the battery, 11 the common muslin bag adapted to hold the positive bobbin of the battery, and 12 denotes a carbon pencil centrally located in the center of the bobbin. As is usual in batteries of the bag type, the muslin bag may be secured to the inside of the zinc shell by a coating of electrolytic paste or in any other desired manner.

Surrounding the carbon pencil of the battery within the bag is carried the depolarizing material, ordinarily a mix of manganese dioxide moistened with an exciting fluid, which is tamped into a compressed mass forming the positive bobbin. Due to the fact that the polarizing action, which takes place when the battery is in service, is almost entirely taken care of by a comparatively thin layer of the depolarizer next to the zinc shell, I propose to make a battery of two or more composite layers of different depolarizing value. As for example, a battery formed with an inner layer 13, adapted to concentrically surround the carbon pencil, consisting of a mix of low grade manganese dioxide, and an outer layer 14, interposed between the inner layer and the negative electrode, consisting of high grade depolarizing material. The usual seal 15 of wax or the like is applied on top of the mixtures inside the zinc casing to prevent evaporation and premature deterioration.

The battery, as described, is formed by tamping the mixture 13 about the carbon pencil 12 in a suitable container, thus forming the inner cylindrical portion of the bobbin. The layer 14 is then formed in the shape of a hollow cylinder by tamping the mixture around a core centrally held in a suitable container. The core is then removed and the inner portion placed within the hollow cylinder, after which they are given an additional tamping to unite the two portions together. When the above has been completed, the bobbin is placed within the muslin bag and the whole inserted in the zinc shell of the battery. The above method of forming my improved battery bobbin has been given for clearness of understanding only and it is to be understood that the invention is not restricted thereto. The portions of the depolarizing mixture may be moistened with proper solutions of zinc and ammonium chloride previous to the tamping process, the use of the moistening paste and its insertion and purpose in the battery being common practice, and is not shown herein as it forms no part of this invention.

Both portions of the depolarizing mixture may have incorporated in them a certain amount of graphite in order to render them electro-conductive.

The portions 13 and 14 may be composed of manganese dioxide or other materials capable of performing the depolarizing function, the difference between the two portions being that portion 13 may be composed of a relatively low grade of material, while portion 14 is to be made of a much higher grade of material of the most active depolarizing capacity. The thickness of this latter named portion being determined by the cost and the type of battery desired.

It is thus possible to produce at least two very important elements by the use of distinct portions of depolarizing mixtures. The quality of commercial batteries may be greatly improved by using in portion 13 a staple grade of depolarizing material, common in the market and much used, and to utilize with it a thin outer portion 14 of a high grade depolarizing material, which is very expensive and would make the price of batteries prohibitive if used alone in the depolarizing mixture of the bobbin. Secondly, a relatively cheap battery may be produced by using in portion 13 material which is principally composed of conductive material. In this manner the cost of a battery and the efficiency thereof may be practically controlled by the extent and depolarizing capacity of the portion 14.

While in the drawing there have been shown but two portions of depolarizing mixtures of different value, there is contemplated the use of more than two distinct portions between the electrodes, of increasing depolarizing power toward the negative electrode.

In the foregoing the invention has been described in but one embodiment thereof and no limitation is to be implied therefrom as the invention is capable of several applications in various forms.

Having thus described my invention, I claim:

1. An electric battery comprising a negative electrode consisting of a zinc shell, a positive electrode therein and two separate portions of depolarizing agent having different depolarizing value.

2. An electric battery comprising a negative electrode, a positive electrode, and two separate portions of depolarizing agent, one of which is richer in depolarizing material than the other.

3. An electric battery comprising a negative electrode, a positive electrode, and two separate portions of depolarizing agent of different richness in depolarizing value, the richer one being adjacent the negative electrode.

4. An electric battery comprising a negative electrode, a positive electrode, and two distinct portions of depolarizing agent of different richness in depolarizing value, the richer of which is relatively thin and placed adjacent the negative electrode, while the poorer portion is relatively thick and is placed adjacent the positive electrode.

5. An electric battery comprising a negative electrode, a positive electrode, and two distinct portions of depolarizing material having different depolarizing value, one of which fills the bulk of the battery, while the other forms only a thin layer.

6. An electric battery comprising a negative electrode, a positive electrode, and depolarizing portions of different degrees of richness of depolarizing material therebetween, said portions increasing in richness in going from the positive electrode to the negative electrode.

7. An electric battery comprising a positive electrode, a negative electrode, and layers of depolarizing material therebetween having different depolarizing value.

8. An electric battery comprising a positive electrode, a negative electrode, and portions of depolarizinig material therebetween, said portions varying in thickness and richness in going from the positive electrode to the negative electrode, the portion at the negative electrode being richer and thinner than the portion at the positive electrode.

9. An electric battery comprising a negative electrode, a bobbin including a positive electrode, a portion of depolarizing material forming the bulk of the bobbin, and a distinct layer of depolarizing material having different depolarizing value from the material forming the bulk of the bobbin, upon the exterior of the bobbin.

10. An electric battery comprising a positive electrode, a negative electrode, a plurality of layers of depolarizing material between the electrodes having different depolarizing values, the layer with the greatest depolarizing value being nearest the negative electrode.

In testimony whereof I affix my signature.

WILLIAM R. LOVEMAN.